United States Patent [19]
Nagel

[11] Patent Number: 5,191,154
[45] Date of Patent: Mar. 2, 1993

[54] METHOD AND SYSTEM FOR CONTROLLING CHEMICAL REACTION IN A MOLTEN BATH

[75] Inventor: Christopher J. Nagel, Boston, Mass.
[73] Assignee: Molten Metal Technology, Inc., Waltham, Mass.
[21] Appl. No.: 737,048
[22] Filed: Jul. 29, 1991
[51] Int. Cl.$^5$ .......................... C02F 1/72; A62D 3/00
[52] U.S. Cl. .................... 588/201; 588/205; 423/210.5; 423/415 R; 423/DIG. 12; 110/346
[58] Field of Search ....................... 266/143, 221, 243; 423/415 R, 659, DIG. 12, DIG. 20, 210.5; 110/204, 346; 588/201, 205

[56] References Cited

U.S. PATENT DOCUMENTS

| | | |
|---|---|---|
| 1,435,652 | 11/1922 | Murrie . |
| 3,749,031 | 7/1973 | Burden, Jr. .......................... 110/8 R |
| 4,218,241 | 8/1980 | Hegemann et al. ...................... 75/60 |
| 4,537,626 | 8/1985 | Pfeiffer et al. .......................... 75/35 |
| 4,540,555 | 9/1985 | Franke et al. ........................ 423/242 |
| 4,574,714 | 3/1986 | Bach et al. ........................... 110/346 |
| 4,601,750 | 7/1986 | Robak et al. ......................... 75/65 R |
| 4,602,574 | 7/1986 | Bach et al. ........................... 110/346 |
| 4,846,083 | 7/1989 | Serbent ............................... 110/344 |
| 4,937,065 | 6/1990 | Maurer et al. ........................ 423/659 |

FOREIGN PATENT DOCUMENTS

| | | |
|---|---|---|
| 0024250 | 2/1981 | European Pat. Off. . |
| 263119 | 4/1988 | European Pat. Off. . |
| 3529740 C | 1/1987 | Fed. Rep. of Germany . |

Primary Examiner—Gary P. Straub
Assistant Examiner—Timothy C. Vanoy
Attorney, Agent, or Firm—Hamilton, Brook, Smith & Reynolds

[57] ABSTRACT

A method and a system is disclosed for controlling chemical reaction of a feed. The feed is directed into a reactor containing a molten bath to at least partially chemically react the feed to form an intermediate component. A portion of the intermediate component is combined with an off-gas which is emitted from the molten bath. At least a portion of the intermediate is then separated from the off-gas and returned to the molten bath. The returned intermediate component is then substantially converted to its atomic constituents. The atomic constituents subsequently exothermically react with other components of the molten bath for reaction to form compounds which are substantially stable at the operating conditions of the system, thereby allowing control of chemical reaction of the feed.

12 Claims, 1 Drawing Sheet

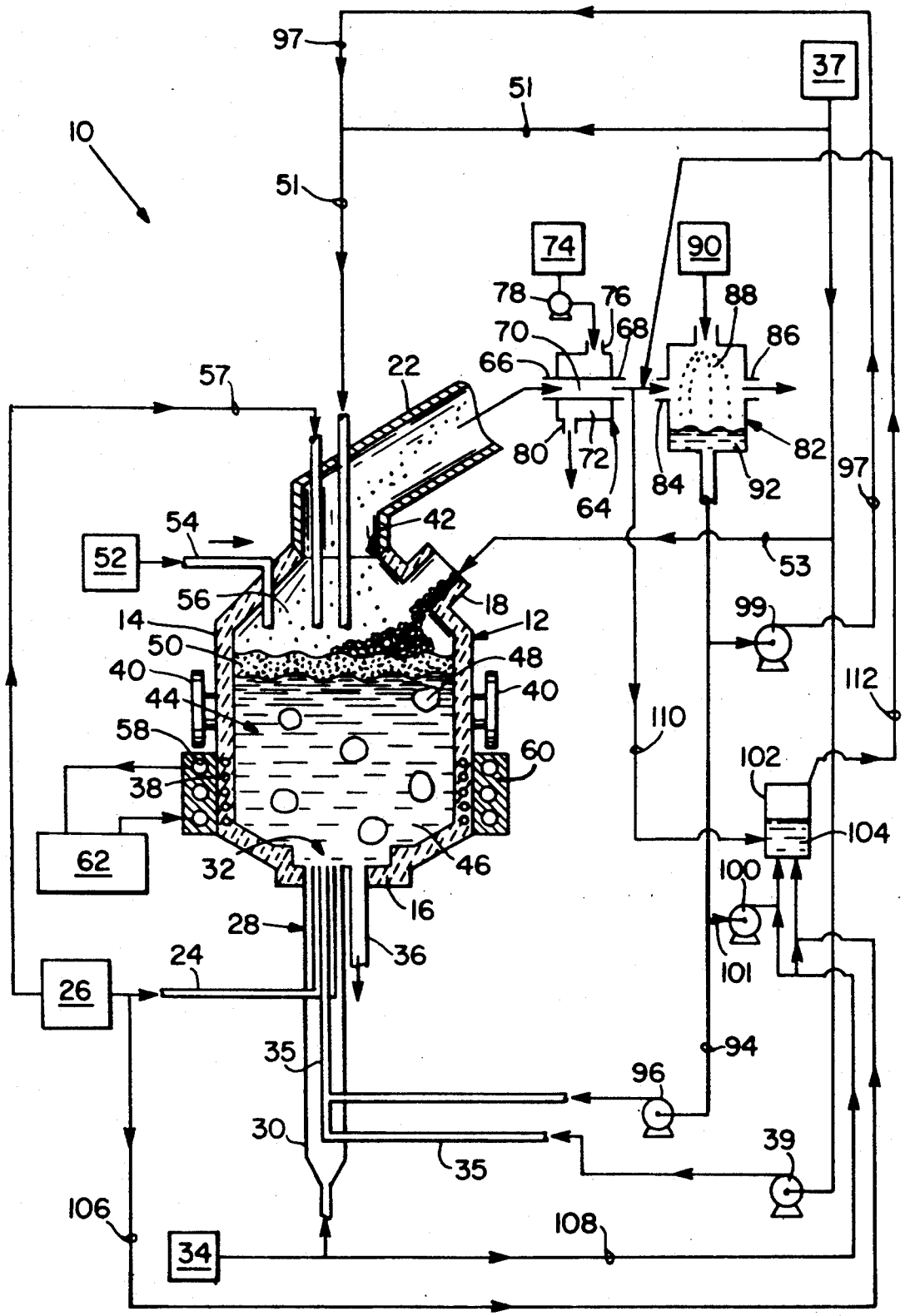

METHOD AND SYSTEM FOR CONTROLLING CHEMICAL REACTION IN A MOLTEN BATH

BACKGROUND OF THE INVENTION

The Environmental Protection Agency (EPA) has estimated that the annual generation of hazardous wastes is in excess of seventy billion gallons. Hazardous wastes include organic materials, such as polychlorinated biphenyls, pesticides, herbicides, municipal garbage, hospital wastes including pathogens, paints, inks and contaminated solvents, black liquor and explosives. Examples of inorganic wastes include oxides of iron, zinc, copper, lead, magnesium, aluminum, chromium and cadmium, various powdered metal manufacturing residues and metal-containing sludges.

Further, the EPA has classified as toxic, ignitable, corrosive or dangerously reactive many common waste materials, such as paint sludge from appliance factories, dregs of chrome and nickel from metal plating shops, spent raw materials for varnish, carpets and detergents at chemical plants, solvents from dry-cleaned clothes and degreased microchips from computers, mercury from exhausted watch batteries, butane residue from disposable cigarette lighters and lye from cans of oven cleaners.

Landfills are becoming less available as a means of disposing of such wastes. In the absence of suitable landfills, hazardous wastes must be transformed to benign and, preferably, useful substances. There has been tremendous investment in development of alternative methods of treating hazardous wastes. Various types of reactors which have been employed for decomposition of hazardous wastes include, for example, liquid injection, multiple hearth, multiple chamber, fluidized bed, molten salt and high efficiency-type boiler reactors. However, many reactors release gases which must be contained or destroyed. Often, these gases are burned, which generally causes formation of free radicals because of the short residence time of the off-gases at flame temperature.

Rotary kilns are a commonly-used type of reactor for combustion of organic wastes. Combustion in rotary kilns typically is initiated by a high temperature flame, whereby reactive species are generated from the organic wastes and then oxidized. However, it is often difficult to contact reactive species with oxygen for oxidation because of poor mixing within the rotary kilns. The rate of destruction of the waste, therefore, can be impeded. Moreover, heat released by combustion occurs away from the flame tip as reacting materials are fed through the rotary kiln, thereby limiting the heat which can be utilized for the initial step of generating reactive species.

Titus, et al., U.S. Pat. No. 3,812,620, disclose a molten pool of glass and miscellaneous metals formed during incineration of "heterogenous waste materials," such as municipal garbage. Various organics in the waste materials are decomposed in the molten pool at temperatures of up to 10,000° F. However, the decomposed materials often are not contacted with oxygen introduced into the molten pool.

Molten salt processes are also known, and are typified by the consumption of solvents and salts in a caustic molten bath into which oxygen and wastes are injected. However, such baths are generally limited to degradation of wastes by chemical reaction rather than thermal destruction. See, for example, U.S. Pat. Nos. 4,447,262, 4,246,255 and 4,017,271.

Oxidation of wastes by reaction of organic materials and oxygen in the presence of water at high temperature and pressure is another method of disposal. See, Wilhelmi, A. R. et al., Chem. Eng. Prog., 75: 46-52 (1979). However, inorganic salts, char and metal-containing solids can accumulate at the walls of apparatus employed for such methods, thus necessitating removal of accumulated deposits, causing corrosion and limiting the operating capacity and useful life of such apparatus.

A need exists, therefore, for a method and system for controlling chemical reaction of a feed which overcome or minimize the aforementioned problems.

SUMMARY OF THE INVENTION

The present invention relates to a new method and system for controlling chemical reaction of a feed composition.

The method includes directing the feed into a reactor within which a molten bath is disposed, the molten bath having a temperature sufficient to chemically react at least a portion of the feed, whereby an intermediate component and atomic constituents are formed. A portion of the intermediate component combines with an off-gas formed in the reactor and is emitted from the reactor. At least a portion of the intermediate component is separated from the emitted off-gas to form an intermediate stream. The intermediate stream is directed into the reactor for chemical reaction of the intermediate component returned to the reactor in the intermediate stream to atomic constituents. At least a portion of the atomic constituents subsequently reacts exothermically with a component of the molten bath, whereby heat generated by the exothermic reaction initiates additional chemical reaction of the feed composition and of the intermediate component, thereby controlling chemical reaction of the feed.

The system includes a reactor and a molten bath disposed in the reactor. The molten bath allows chemical reaction of the feed composition. Suitable means direct the feed into the reactor at a temperature sufficient to cause chemical reaction of the feed to form an intermediate component and atomic constituents of the feed. Suitable means form an off-gas in the reactor which combines with a portion of the intermediate component and is emitted from the reactor. Suitable means separate at least a portion of the intermediate component from the off-gas emitted from the reactor to form an intermediate stream. Suitable means direct said intermediate stream into the reactor for chemical reaction of the intermediate component returned to the reactor in the intermediate stream to atomic constituents and subsequent exothermic reaction of at least a portion of the atomic constituents with a component of the molten bath. Heat generated by the exothermic reaction initiates additional chemical reaction of the feed and of the intermediate component, thereby controlling chemical reaction of the feed.

This invention has many advantages. Chemical reaction of the feed causes formation of intermediate components, such as light hydrocarbons, and of atomic constituents. At least a portion of the atomic constituents are reactive with other components of the molten bath, such as oxygen, thereby allowing formation of relatively stable compounds, such as water and carbon dioxide. Heat generated by exothermic reaction of the atomic constituents can be sufficient to initiate additional chemical reaction of feed. Relatively volatile feed can be introduced on top of a molten bath for chemical reaction. A substantial portion of any intermediate components which volatilize and are emitted from the reactor with the off-gas are returned to the molten bath for chemical reaction, such as conversion to atomic constituents, and subsequent exothermic reaction of the atomic constituents to form relatively stable compounds.

Return of intermediate components from the off-gas to the molten bath enables more complete conversion to stable compounds in the system, thereby significantly reducing emission of toxins in the off-gas to the atmosphere. Also, steady state conditions of reaction systems within a molten bath, such as dehydrogenation of water, or a water-gas shift reaction above the molten bath, can be controlled by employing water as the liquid used to scrub the off-gas. In addition, intermediate components and other components of the off-gas, such as atomic constituents of the feed composition, can be returned to the reactor to thereby control reactions within the molten bath. Return of reactive components also conserves the calorific value of feed introduced to the system.

The molten bath can include immiscible metals, allowing selection of combinations of metals according to relative solubility and free energies of oxidation, whereby reaction of reactive components can be controlled to form relatively stable compounds. Chemical, mass and thermal energies can be transferred within the molten bath to create physicochemical environments which can lead to formation of thermodynamically stable compounds at the conditions specified by each phase of a multi-phase molten bath.

The high solubility of resultant compounds in the individual phases of the multi-phase reaction system permits collection of significant amounts of these compounds by the respective phases. Many of the compounds formed can be disposed of by incorporation into a vitreous non-leachable crystallographic matrix of a vitreous layer disposed over the molten metal. Gaseous emissions of deleterious compounds can thereby be further reduced.

BRIEF DESCRIPTION OF THE DRAWINGS

The FIGURE is a schematic representation of one embodiment of the system of the invention.

DETAILED DESCRIPTION OF THE INVENTION

The features and other details of the method of the invention will now be more particularly described with reference to the accompanying figure and pointed out in the claims. It will be understood that particular embodiments of the invention are shown by way of illustration and not as limitations of the invention. The principal functions of this invention can be employed in various embodiments without departing from the scope of the invention.

The present invention generally relates to a method and system for controlling decomposition of a feed composition in a molten metal bath. Bach et al., U.S. Pat. Nos. 4,754,714 and 4,602,574, disclose a molten metal bath, such as is used in a steel-making facility, which destroys polychlorinated biphenyls and other organic wastes, optionally together with inorganic wastes. Nagel, U.S. patent application Ser. No. 07/557,561, filed Jul. 24, 1990, discloses a method and system for forming carbon dioxide from carbon-containing materials in a molten bath of immiscible metals. The teachings of U.S. Pat. Nos. 4,754,714 and 4,602,574, and of U.S. patent application Ser. No. 07/557,561, are incorporated herein by reference.

In one embodiment of the invention, illustrated in the FIGURE, system 10 includes reactor 12. Examples of suitable vessels include K-BOP, Q-BOP, argon-oxygen decarbonization furnace (AOD), EAF, etc., such as are known in the art. Reactor 12 has an upper portion 14 and a lower portion 16. Feed inlet 18 at upper portion 14 of reactor 12 is suitable for directing feed into reactor 12. Off-gas outlet 22 extends from upper portion 14 and is suitable for conducting an off-gas out of reactor 12.

Tuyere 28 includes coolant tube 30, oxidant inlet tube 24 and feed inlet tube 35. Coolant tube 30 extends from coolant source 34 to reactor 12. Oxidant inlet tube 24 extends from oxidant source 26 to lower portion 16 of reactor 12. Oxidant inlet tube 24 is disposed within coolant tube 30 at tuyere opening 32. Feed inlet tube 35 extends from feed source 37 to tuyere 28. Feed inlet tube 35 is disposed within oxidant inlet tube 24 at tuyere opening 32. Pump 39 is disposed at tuyere 28 to direct a suitable feed from feed source 37 and through tuyere opening 32 into reactor 12.

Tuyere 28 is dimensioned and configured for conjointly and continuously introducing a suitable carbon-containing gas and oxidant into reactor 12. It is to be understood, however, that the coolant and oxidant can be introduced to reactor 12 separately and/or intermittently, rather than conjointly and continuously. It is also to be understood that more than one tuyere 28 can be disposed in reactor 12 and that concentric, or multiple concentric tuyeres, can be employed for separate introduction of reactants, such as feed and oxidant, into reactor 12. For example, the feed can be introduced through a first double concentric tuyere, not shown, and the oxidant can be separately introduced through a second double concentric tuyere, also not shown, as an alternative to employing tuyere 28. Double concentric tuyeres, such as for separate introduction of feed and oxidant, can be located proximately or remotely from each other in reactor 12. Further, it is to be understood that feed can be introduced into reactor 12 by other suitable methods, such as by employing a consumable lance, etc. In one embodiment, the feed and oxidant are introduced according to the method and system described in U.S. Patent Application, titled "Method and System of Formation and Oxidation of Dissolved Atomic Constituents in a Molten Bath" and filed by Casey E. McGeever and Christopher J. Nagel, the teachings of which are incorporated herein by reference.

Bottom-tapping spout 36 extends from lower portion 16 and is suitable for removal of at least a portion of a molten bath from reactor 12. Additional drains can be provided as a means of continuously or intermittently removing distinct molten phases. Material can also be removed by other methods, such as are known in the art. For example, material can be removed from reactor 12 by rotating vessel 12 and employing a launder, not shown, extending from feed inlet 18. Alternatively, the launder can extend into reactor 12 through a tap hole, also not shown.

Induction coil 38 is disposed at lower portion 16 for heating reactor 12 or for initiating generation of heat within reactor 12. It is to be understood that, alternatively, reactor 12 can be heated by other suitable means, such as by oxyfuel burners, electric arc, etc. Trunions 40 are disposed at reactor 12 for manipulation of reactor 12. Seal 42 is disposed between reactor 12 and off-gas outlet 22 and is suitable for allowing partial rotation of reactor 12 about trunions 40 without breaking seal 42. Alternatively, reactor 12 does not include trunions 40 or seal 42 and does not rotate.

Molten bath 44 is disposed within reactor 12. In one embodiment, molten bath 44 includes a metal having a free energy of oxidation, at operating conditions of system 10, which is greater than that of conversion of atomic carbon to carbon monoxide. In one example, molten bath 44 includes carbon in an amount in the range of between about ⅛ percent and about six percent by weight. The amount of carbon in molten bath 44 can be controlled, for example: by introduction of a feed, which includes carbon and oxidant, to molten bath 44; by controlling the rate of removal of off-gas from molten bath 44; by controlling system conditions, e.g., temperature, of system 10; by controlling the relative amounts of other components in molten bath 44; etc.

Examples of suitable metals in molten bath 44 include iron, chromium, manganese, copper, nickel, cobalt, etc. It is to be understood that molten bath 44 can include more than one metal. For example, molten bath 44 can include a solution of metals. Also, it is to be understood that molten bath 44 can include oxides of the molten metals. As disclosed in U.S. patent application Ser. No. 07/557,561, molten bath 44 can include more than one phase of molten metal. In one embodiment, molten bath 44 is formed of a vitreous phase which includes at least one metal oxide and does not include a molten metal phase. In another embodiment, the vitreous phase can include at least one salt.

Molten bath 44 includes first molten metal phase 46 and second molten metal phase 48, which is substantially immiscible in first molten metal phase 46. Both first molten metal phase 46 and second molten metal phase 48 can comprise solutions of metals. The solubility of atomic carbon in second molten metal phase 48 can be significantly less than in first molten metal phase 46.

First molten metal phase 46 has a free energy of oxidation, at operating conditions of system 10, greater than that of oxidation of atomic carbon to form carbon monoxide. Second molten metal phase 48 has a free energy of oxidation at the operating conditions of system 10 greater than that of oxidation of carbon monoxide to form carbon dioxide. Oxidation of atomic carbon, therefore, is more complete because carbon monoxide, which is formed from atomic carbon in first molten metal phase 46, is substantially converted to carbon dioxide in second molten metal phase 48.

Molten bath 44 can be formed by at least partially filling reactor 12 with a suitable metal. The metal is then heated to a suitable temperature by activating induction coil 38 or by other means, not shown. Where two immiscible metals are introduced to reactor 12, the metals separate during melting to form first molten metal phase 46 and second molten metal phase 48. In one embodiment, the viscosity of at least one phase of molten bath 44 is less than about ten centipoise at the operating conditions of system 10. In another embodiment, the viscosity of at least one phase of molten bath 44 is less than about thirty poise at the operating conditions of system 10.

Suitable operating conditions of system 10 include a temperature sufficient to chemically react feed from feed source 37 and thereby form at least one intermediate component. "Intermediate component," as that term is used herein, means components which are formed from feed and which can be chemically reacted, such as by conversion to atomic constituents, for subsequent exothermic reaction with a component of molten bath 44. The intermediate component can be, for example, an organic compound or an inorganic compound. In one embodiment, the operating conditions of molten bath 44 includes a temperature sufficient to cause the free energy of oxidation of metal in molten bath 44 to be greater than that of conversion of atomic carbon to carbon monoxide. The temperature of molten bath 44 is also sufficient to cause molten bath 44 to convert carbon in the intermediate component to atomic carbon.

Vitreous layer 50 is disposed on molten bath 44. Vitreous layer 50 is substantially immiscible with molten bath 44. Alternatively, system 10 does not include vitreous layer 50. Vitreous layer 50 includes at least one metal oxide, the metal element of which has a free energy of oxidation, at operating conditions of system 10, less than the free energy of oxidation of atomic carbon to carbon monoxide.

The solubility of carbon and of carbon monoxide in vitreous layer 50 can be less than that of molten bath 44, thereby causing atomic carbon and carbon monoxide to be retained within molten bath 44. In another embodiment, vitreous layer 50 has a lower thermal conductivity than that of molten bath 44. Radiant loss of heat from molten bath 44 can thereby be reduced to significantly below the radiant heat loss from molten bath 44 when no vitreous layer 50 is present.

Examples of suitable metal oxides of vitreous layer 50 include titanium oxide ($TiO_2$), zirconium oxide ($ZrO_2$), aluminum oxide ($Al_2O_3$), magnesium oxide (MgO), calcium oxide (CaO), silica ($SiO_2$), etc. Other examples of suitable components of vitreous layer 50 include halogens, sulfur, phosphorus, heavy metals, etc. It is to be understood that vitreous layer 50 can include more than one metal oxide. Vitreous layer 50 can contain more than one phase. Typically, vitreous layer 50 is substantially fluid and free radicals and other gases can pass across vitreous layer 50 from molten bath 44.

Vitreous layer 50 can be formed by directing suitable materials, such as metals, metal oxides, halogens, sulfur, phosphorus, heavy metals, sludges, etc., from source 52 through inlet tube 54 and into molten bath 44. Inorganic components of feed 20 can also be included in vitreous layer 50. The materials from source 52 can be directed onto the top of molten bath 44 or injected into molten bath 44, using methods such as are well-known in the art. The materials can form other stable compounds at the operating conditions of system 10 by reaction, for example, with alkali metal cations or alkaline earth metal cations. Examples of such stable reaction products include calcium fluoride ($CaF_2$) and magnesium phosphate ($Mg(PO_4)_2$). In one embodiment, vitreous layer 50 contains is about forty percent calcium oxide, about forty percent silicone dioxide and about twenty percent aluminum oxide, and is about five inches thick.

Feed, in solid or liquid form, is directed from feed source 37 into reactor 12. The feed can be introduced to reactor through line 35, line 51 and/or line 53. Generally, the feed includes organic compounds, such as alkenes, alkynes, etc. Alternatively, the feed can be directed into reactor 12 through inlet 18 as whole articles, such as paper products, lumber, tires, coal, etc. It is to be understood that inorganic compositions can also be used as feed for introduction and chemical reaction in system 10. Suitable examples of inorganic feeds include, but are not limited to, metals and their oxides, sulfides and halides. In addition to carbon, feed can include other atomic constituents, such as hydrogen, halide, metals, etc.

The feed directed into reactor 12 combines with molten bath 44 and can also combine with vitreous layer 50. Contact of the feed with molten bath 44 or vitreous layer 50 exposes the feed to conditions sufficient to chemically react at least a portion of the components in the feed. Chemical reaction of the feed causes formation of at least one intermediate component.

The feed, oxidant and coolant are directed into molten bath 44 through tuyere 28. The feed can also be directed into reactor 16 from feed source 37 through conduit 51. Conduit 51 discharges the feed above vitreous layer 50. Alternatively, conduit 51 can extend within molten bath 44 for discharging the feed at a point beneath the surface of molten bath 44. The feed is suitable for chemical reaction in molten bath 44 to form atomic constituents and at least one intermediate component. In one embodiment, at least one of the atomic constituents formed from the feed is exothermally reactive with a component of molten bath 44. For example, the atomic constituents can be reactive with the oxidant introduced to molten bath 44 through tuyere 28.

A portion of the oxidant directed into molten bath 44 can also react with atomic carbon and other reactive components to form carbon monoxide and carbon dioxide, which are substantially stable at the operating conditions of system 10. Introduction of oxidant into molten bath 44 can also cause at least a portion of the intermediate component in molten bath 44 to exothermically react with the oxidant to form an oxide. Typically, the stoichiometric ratio of oxidant introduced to system 10 to the oxidizable portion of exothermally reactive components in molten bath 44 is greater than about 1:1.

The coolant, such as a suitable shroud gas, is suitable for cooling the region within reactor 16 proximate to tuyere 28 under the operating conditions of system 10. Examples of suitable coolants include nitrogen gas ($N_2$), steam, methane ($CH_4$), chlorobenzene ($C_6H_5Cl$), etc. In one embodiment, chlorobenzene is converted by exposure to molten bath 44 to form hydrocarbon-fragment radicals and chlorine radicals.

Gaseous layer 56 is formed over vitreous layer 50. In one embodiment, gaseous layer 56 extends from upper portion 14 of reactor 12 through off-gas outlet 22 to scrubber 82. A reaction zone within system 10 includes molten bath 44, vitreous layer 50 and gaseous layer 56. Reactants, such as feed and an oxidant, can be introduced anywhere within the reaction zone. Gaseous layer 56 includes off-gas formed in molten bath 44 and in vitreous layer 50. Off-gas is formed by oxidation of carbonaceous gas and includes reaction products, such as hydrogen, water vapor, carbon monoxide and carbon dioxide. The off-gas also includes at least one intermediate component which has been entrained or which has been volatilized before decomposition to its atomic constituents within molten bath 44. It is to be understood, however, that the conditions of gaseous layer 56 can be suitable for forming at least one intermediate component in gaseous layer 56.

In one embodiment, gaseous layer 56 includes an oxidant, such as oxygen, directed into upper portion 14 from oxidant source 26 through second oxidant inlet tube 57. Atomic constituents formed in molten bath 44 and in vitreous layer 50 react with oxidant in gaseous layer 56 or with other materials, such as organic or inorganic compounds, passing through gaseous layer 56. Carbonaceous gases formed within molten bath 44, such as carbon monoxide and carbon dioxide, are displaced from molten bath 44 as gaseous bubbles. Introduction of oxidant to reactor 12 through second oxidant inlet tube 57 is conducted at a rate sufficient to maintain an oxidant partial pressure in molten metal reactor 12 which allows a substantial portion of atomic carbon in molten bath 44 to be oxidized.

A substantial portion of the reaction within reactor 12 occurs within the reaction zone. Exothermic reaction of atomic constituents formed from the feed, such as formation of carbon monoxide and carbon dioxide by reaction of atomic carbon with oxidant, and other exothermic reactions which form inorganic compounds, such as calcium fluoride, generate heat for chemical reaction of the feed and components thereof in the reaction zone.

Heat released by exothermic reaction in the reaction zone can also be transferred out of system 10. In one embodiment, heat is conducted from lower portion 16 to coil 58. Coil 58 is covered by insulation 60, and containing a suitable heat transfer medium, such as water or liquid metal. The heat transfer medium is circulated through coil 58 to thereby transfer heat from molten bath 44 to power generating means 62. An example of a suitable power generating means is a steam turbine.

Off-gas formed in reactor 12 is conducted from the reaction zone through off-gas outlet 22 to heat exchanger 64. Heat exchanger 64 can be any suitable heat exchanger for cooling off-gas discharged from reactor 12. Examples of suitable heat exchangers include water-cooled hoods, shell-and-tube heat exchangers, etc.

The off-gas is conducted into heat exchanger 64 through heat exchanger off-gas inlet 66 and then through heat-exchanger off-gas outlet 68. The off-gas is cooled in heat exchanger 64 by conducting the off-gas through an off-gas side 70 of heat exchanger 64 and by directing a suitable cooling medium through a medium-side 72 of heat exchanger 64. Examples of suitable cooling mediums include, for example, water, ethylene glycol, ethyl benzene, alcohols, etc.

The cooling medium is directed from cooling medium source 74 through cooling medium inlet 76 of heat exchanger 64 by a suitable means, such as by use of pump 78 disposed between cooling medium source 74 and heat exchanger 64. The cooling medium is directed through the medium side 72 of heat exchanger 64, thereby cooling the off-gas, and then directed out of heat exchanger 64 through cooling medium outlet 80. The cooling medium is conducted through heat exchanger 64 at rate sufficient to cool the off-gas to a temperature suitable for subsequent formation of a liquid composition from the cooled off-gas. In one embodiment, the off-gas is cooled to a temperature below about 500° C. In another embodiment, such as when high-molecular weight polyaromatics, having a molecular weight in the range of between about one hundred and one thousand, are present, the off-gas is cooled to a temperature below about 200° C.

The off-gas is directed out of heat exchanger off-gas outlet 68 to a suitable separating means for exposing the off-gas to conditions sufficient to remove at least a portion of a intermediate component from the off-gas. In one illustration, the separating means is scrubber 82. Suitable scrubbers for use with system 10 include, for example, a wet-venturi scrubber, etc. The off-gas is directed through scrubber off-gas inlet 84 and then through scrubber 82 to scrubber off-gas outlet 86.

Scrubber fluid 88 is directed from scrubber fluid source 90 to scrubber 82 by a suitable means, such as by gravity or by a pump, not shown. Scrubber fluid 88 can be any fluid suitable for contacting the off-gas to thereby cause at least one intermediate component of the off-gas which is to be returned to molten bath 44 to be captured by scrubber fluid 88. Examples of suitable scrubber fluids include water, organic solvents, etc. It is to be understood that scrubber fluid 88 can comprise mixtures or solutions of, for example: solutions of different organic solvents; water and one or more organic solvents; or of a liquid and a solid, etc. Examples of solids which can be included in scrubber fluid 88 include, for example, carbon-containing wastes which are to be converted to atomic carbon and then oxidized to form carbon monoxide and carbon dioxide in molten bath 44.

Scrubber fluid 88 is introduced to scrubber 82 at a temperature suitable for removing at least a portion of the intermediate component from the off-gas. In one embodiment, scrubber fluid 88 is at a temperature below about 50° C. In another embodiment, such as when high-boiling scrubbing mediums, having a boiling temperature of greater than about 100° C. at atmospheric pressure, are employed, the temperature of scrubber fluid 88 is below about 150° C. Alternatively, scrubber 82 and scrubbing fluid 88 can provide sufficient cooling without additional cooling of the off-gas and intermediate component by heat exchanger 64.

It is to be understood that additional separating means can be employed to separate components from off-gas discharged from reactor 16. For example, a suitable cyclone separator, not shown, and a suitable spray drier, also not shown, can be disposed between heat exchanger 64 and scrubber 82. The cyclone separator can be employed to separate dust particles from the off-gas. The spray drier can be employed to separate halides, for example, from the off-gas. Also, off-gas discharged from scrubber 82 can be treated before release to the atmosphere. For example, the off-gas can be conducted through a suitable electrostatic precipitator, not shown, to separate charged particles in the off-gas. The off-gas is then conducted through a suitable baghouse or filter employing activated carbon, also not shown, to remove remaining particulates.

Liquid composition 92 is formed by scrubbing of the off-gas with scrubber fluid 88. Liquid composition 92 is directed from scrubber 82 to reactor 12. In one embodiment, liquid composition 92 is pumped through piping 94 by pump 96 to the feed inlet tube 35. Examples of suitable pumps include a centrifugal pump, a positive displacement pump, etc. Liquid composition 92 is thereby combined with the feed for introduction into molten bath 44 through tuyere 28. In another embodiment, liquid composition 92 is directed through piping 97 by pump 99 to conduit 51. Liquid composition 92 is thereby combined with the feed for introduction into reactor 12 and onto molten bath 44. It is to be understood that, in the embodiment wherein conduit 51 extends beneath the surface of molten bath 44, liquid composition 92 in conduit 51 will be directed into molten bath 44.

The intermediate component is thereby returned in liquid composition 92 from the off-gas to molten bath 44. A substantial portion of the intermediate composition is then chemically reacted to its atomic constituents for subsequent exothermic reaction of the atomic constituents with oxidant or other components of molten bath 44 to form compounds which are substantially stable at the operating conditions of system 10. Chemical reaction of the intermediate component in system 10 is thereby controlled.

The intermediate component can be selectively removed from the off-gas by employing a suitable scrubber fluid 88. For example, scrubber fluid 88 can include an organic solvent for selectively collecting relatively high-molecular weight intermediate compounds, such as light oil (e.g., containing more than three carbon atoms per molecule) from the off-gas, the light oil having been volatilized during chemical reaction of solid carbonaceous materials, such as coal, in molten bath 44. Scrubber fluid 88 and the light oil form a liquid composition which is pumped into lower portion 16 of reactor 12. Alternatively, the scrubber fluid in the liquid composition can be concentrated by a suitable method before being directed into reactor 12. One example of a suitable method of concentrating the liquid composition is by exposing the liquid composition to conditions sufficient to volatilize a significant portion of the scrubber fluid. The concentrated liquid composition is then directed into reactor 12.

The organic solvent and light oil are then chemically reacted to form their respective atomic constituents. Atomic constituents, such as atomic carbon, are then substantially oxidized to form more stable reaction products, such as carbon monoxide and carbon dioxide. The carbon monoxide and carbon dioxide form bubbles which escape molten bath 44 into gaseous layer 56 as off-gas which is conducted out of system 10 through heat exchanger 64 and scrubber 82. Other carbonaceous compounds (e.g. containing three carbon atoms or less per molecule) formed from the solid carbonaceous material can form gaseous synfuel, which is emitted from system 10.

Alternatively, at least a portion of liquid composition 92 can be directed from scrubber 82 by pump 100 through line 94 and line 101 to reactor 102. Reactor 102 has molten bath 104 disposed therein. In one embodiment, molten bath 104 includes at least one molten metal phase suitable for allowing chemical reaction of the intermediate component, such as conversion of the intermediate component to its atomic constituents and subsequent oxidation of the atomic constituents, at the operating conditions of system 10. Examples of suitable metals of the molten metal phase include metals which are suitable for forming molten bath 44. In one embodiment, molten bath 104 includes the same composition as molten bath 44 and has a temperature sufficient to chemically react at least a portion of the intermediate component, whereby at least a portion of the intermediate component is converted to atomic constituents and subsequently at least a portion of the atomic constituents react with a component of molten bath 104, thereby controlling chemical reaction of the feed. The reaction between the atomic constituents and the component of molten bath 104 can be exothermic or endothermic.

Liquid composition 92 is directed into reactor 102 by a suitable method and means, such as by the methods and means which are suitable for directing the feed and liquid composition 92 into reactor 12. Typically, the feed and liquid composition are injected into molten bath 104 through a tuyere, not shown, into molten bath 104. An oxidant is directed from oxidant source 26 through line 106 and a tuyere, not shown, into molten bath 104. Coolant is directed from coolant source 34 through line 108 for injection into molten bath 104, with feed and oxidant, through their respective tuyeres.

Alternatively, off-gas generated in reactor 12 is directed from heat exchanger 64 to reactor 102 without first being directed through scrubber 82. For example, off-gas can be conducted through line 110, extending between heat exchanger 64 and reactor 102, to reactor 102. The off-gas can also be directed to reactor 102 through turbine 111 at line 110 for depressurization of the off-gas.

An off-gas is generated above molten bath 104. The off-gas can include, for example, reaction products of the exothermic reaction in molten bath 104, organic and inorganic radicals, and intermediate components. The off-gas is directed to scrubber 82 through line 112. It is to be understood that the off-gas can be directed to the reaction zone associated with reactor 12 and off-gas outlet 22. Optionally, the off-gas can be treated by other suitable means for recovery of components of the off-gas and subsequent discharge to the atmosphere. In one embodiment, the off-gas can be directed to another heat exchanger and scrubber, not shown, for removal of components from the off-gas and introduction of the removed components to another reactor, also not shown.

In a further illustration of the invention, the feed includes municipal waste, such as discarded automobile tires. The municipal waste chemically reacts and is absorbed by vitreous layer 50 and molten layer 44, where a portion of the intermediate components are converted to form atomic carbon. A portion of the intermediate components can volatilize in reactor 12 or be entrained by off-gas before conversion to atomic carbon is complete. Oxidant is introduced to at least partially oxidize atomic carbon to form carbonaceous gases, such as carbon monoxide and carbon dioxide. Inorganic reactive components, including toxins, and other reactive compounds, such as sulphur compounds, can also volatilize or be entrained as particulates in the off-gas.

Reactive components of the off-gas, such as the inorganic compounds, can be captured by scrubber fluid 88 for formation of liquid composition 92, which is directed from scrubber 82 to reactor 12. Scrubber fluid 88 can include polar and non-polar media for capture of select organics and/or inorganics which are directed to molten bath 44 and can be scavenged by vitreous layer 50. Metals in the municipal waste can be absorbed by molten bath 44. Metal oxides in the municipal waste can be contained by vitreous layer 50. Toxins in the off-gas are returned to molten bath 44 in liquid composition 92 before discharge of the off-gas from system 10.

In still another illustration of the invention, the feed includes drums, containing volatile toxic organic compounds, which are introduced to reactor 12 through the feed inlet 18. The drums and their contents are chemically reacted by molten bath 44 and vitreous layer 50. At least a portion of organic compounds of the toxic organic waste are volatilized and then directed with the off-gas to scrubber 82 for condensation by scrubber fluid 88. The volatilized toxic organic compounds are thereby removed from the off-gas before discharge of the off-gas from system 10 and are returned in liquid composition 92 to molten bath 44 for further chemical reaction of the carbon-containing the feed 20 and for exothermic reaction of the resulting atomic carbon with oxidant to form carbon monoxide and carbon dioxide.

In addition to atomic carbon, constituents of other intermediate components of the carbon-containing gas can also be formed. These other constituents can at least partially dissolve in molten bath 44 or vitreous layer 50. The relative amount of each atomic constituent dissolved in molten bath 44 and vitreous layer 50 is dependent upon their relative solubility. The constituents can react exothermically with other intermediate components in molten bath 44 and vitreous layer 50 to thereby generate heat and form reaction products which are stable at operating conditions of system 10. In addition, free radicals, including triplet carbon monoxide, can contribute to formation of other free radicals from the feed or heat-absorbing gas.

Alternatively, constituents other than atomic carbon can form which are substantially insoluble in molten bath 44 and vitreous layer 50. Such constituents migrate within molten bath 44 and vitreous layer to gaseous layer 56 above vitreous layer 50. Oxidant introduced into gas layer 56 through second oxidant inlet tube 57 contacts the constituents and can at least partially react with the constituents to form gaseous oxides. The gaseous oxides are removed from molten metal reactor 12 through off-gas outlet 22. These gaseous oxides can be selectively removed from the off-gas at scrubber 82 for return with liquid composition 92 to molten bath 44 or vitreous layer 50 for chemical reaction or containment within molten bath 44 or vitreous layer 50.

Reactor 12 is constructed of a suitable material, such as materials which are known in the art. Heat exchanger 64 is constructed of a suitable material for resistance to corrosion and thermal stress at the temperature of the off-gas. The temperature of off-gas emitted from molten metal reactor 12 is typically above about 1500° C. Scrubber 82 is constructed of a material suitable for resistance to attack by the off-gas or by the scrubber fluid under use-conditions.

EQUIVALENTS

Those skilled in the art will recognize, or be able to ascertain using no more than routine experimentation, many equivalents of the invention described specifically herein. Such equivalents are intended to be encompassed in the scope of the following claims.

I claim:

1. A method for controlling chemical reaction of a feed, comprising the steps of:
    a) directing the feed into a reactor within which a molten bath is disposed, the molten bath having a temperature sufficient to chemically react at least a portion of the feed, whereby an intermediate component, which includes a carbon chain of greater than three carbons, and atomic constituents are formed, a portion of the intermediate component combining with an off-gas formed in the reactor and being emitted with the off-gas from the reactor;
    b) separating at least a portion of the intermediate component from the off-gas to form an intermediate stream;
    c) directing said intermediate stream into the reactor for chemical reaction of the intermediate component which is returned to the reactor to form atomic constituents and subsequent exothermic reaction of at least a portion of the atomic constituents with an oxidant in the molten bath; and d) directing an oxidant into the molten bath which exothermally reacts with said atomic constituents, whereby heat generated by the exothermic reaction initiates additional chemical reaction of the feed and of the intermediate component, thereby controlling chemical reaction of the feed.

2. A method of claim 1 wherein the feed is directed into the reactor at an upper portion of said reactor.

3. A method of claim 2 wherein the intermediate component is separated from the off-gas emitted by scrubbing the off-gas with a scrubber liquid.

4. A method of claim 3 wherein the scrubber liquid includes a non-polar compound.

5. A method of claim 4 wherein the scrubber liquid further includes a polar compound.

6. A method of claim 5 wherein the non-polar compound includes an organic compound.

7. A method of claim 6 when the polar compound includes water.

8. A method for controlling chemical reaction of a feed, comprising the steps of:
   a) directing the feed into a first reactor, within which a first molten bath is disposed, the first molten bath having a temperature sufficient to chemically react at least a portion of the feed, whereby an intermediate component and atomic constituents are formed, a portion of the intermediate component combining with an off-gas formed in the first reactor and being emitted from the first reactor with the off-gas;
   b) directing at least a portion of said intermediate component into a second reactor, within which a second molten bath is disposed, the second molten bath having a temperature sufficient to chemically react the intermediate component, whereby at least a portion of the intermediate component chemically reacts to form atomic constituents and whereby at least a portion of the atomic constituents react with an oxidant in the molten bath; and
   c) directing an oxidant into the molten bath which reacts exothermally with said atomic constituents, whereby heat generated by the exothermic reaction initiates additional chemical reaction of the intermediate component formed from the feed, thereby controlling chemical reaction of the feed.

9. A method of claim 8, further including the steps of:
   a) separating at least a portion of the intermediate component from the off-gas discharged from the first reactor to form an intermediate stream; and
   b) directing at least a portion of the intermediate stream into the second reactor for chemical reaction of at least a portion of the intermediate component to form atomic constituents.

10. A method of claim 9, further including the step of directing a portion of the intermediate stream into the first reactor for chemical reaction of the intermediate component returned to the first reactor in the intermediate stream to atomic constituents and for subsequent exothermic reaction of at least a portion of the atomic constituents with a component of the first molten bath, whereby heat generated by the exothermic reaction initiates additional chemical reaction of the feed and of the intermediate component, thereby controlling chemical reaction of the feed.

11. In a method for chemical reaction of a feed, wherein the feed is directed into a reactor within which a molten bath is disposed, the molten bath having a temperature sufficient to chemically react at least a portion of the feed, whereby an intermediate component, which includes a carbon chain having greater than three carbons, and atomic constituents are formed, a portion of the intermediate component combining with an off-gas formed in the reactor and being emitted from the reactor with the off-gas:
   the improvement comprising separating at least a portion of the intermediate component from the off-gas to form an intermediate stream and directing said intermediate stream into the reactor for chemical reaction of the intermediate component returned to the reactor in the intermediate stream to form atomic constituents and subsequent exothermic reaction of at least a portion of the atomic constituents with an oxidant directed into the molten metal bath, whereby heat generated by the exothermic reaction initiates additional chemical reaction of the feed and of the intermediate component, thereby controlling chemical reaction of the feed.

12. In a method for chemical reaction of a feed, wherein the feed is directed into a reactor within which a molten bath is disposed, the molten bath having a temperature sufficient to chemically react at least a portion of the feed, whereby an intermediate component, which includes a carbon chain of at least three carbons, and atomic constituents are formed, a portion of the intermediate component combining with an off-gas formed in the reactor and being emitted from the reactor with the off-gas:
   the improvement comprising directing at least a portion of the intermediate component from the off-gas to a second reactor having a second molten bath disposed therein for chemical reaction of the intermediate component in the second reactor to form atomic constituents and for subsequent reaction of at least a portion of the atomic constituents with a component of the second molten bath, thereby controlling chemical reaction of the feed.

* * * * *